United States Patent

[11] 3,621,064

[72] Inventor Jacob Rosin
 Maplewood, N.J.
[21] Appl. No. 839,638
[22] Filed July 7, 1969
[45] Patented Nov. 16, 1971
[73] Assignee Chris-Craft Industries, Inc.

[54] PRODUCTION OF 5-CHLOROSALICYLALDEHYDE
 8 Claims, No Drawings
[52] U.S. Cl. .................................................. 260/600
[51] Int. Cl. .................................................. C07c 47/56
[50] Field of Search .......................................... 260/600

[56] References Cited
OTHER REFERENCES

Rodd, Chemistry of Carbon Compounds Vol. III B, (1956), page 742

Primary Examiner—Bernard Helfin
Attorney—Pennie, Edmonds, Morton, Taylor and Adams ABSTRACT: 5-Chlorosalicylaldehyde, m.p. 100.6° to 101.0° C., purity 99+ percent when measured by gas chromatography, is produced in excellent yields by reaction process in which (a) salicylaldehyde is reacted with approximately an equimolar quantity of chlorine to form a crude reaction mixture composed of 5-chlorosalicylaldehyde, unreacted salicylaldehyde and minor amounts of various organic impurities, (b) the crude reaction mixture is subjected to partial vacuum distillation to distill substantially all of the unreacted salicylaldehyde from the crude reaction mixture while leaving 5-chlorosalicylaldehyde and the various organic impurites in the distillation residue, (c) the vacuum-topped distillation residue is dissolved in an aqueous solution of a lower alkanol from which solution 5-chlorosalicylaldehyde crystallizes while leaving the organic impurities dissolved in solution, and (d) the crystallized 5-chlorosalicylaldehyde is recovered. Unless the crude reaction mixture is vacuum topped to remove substantially all of the unreacted salicylaldehyde, then the crystallization of 5-chlorosalicylaldehyde requires relatively large amounts of solvent and yields a product with a low-bulk density.

3,621,064

PRODUCTION OF 5-CHLOROSALICYLALDEHYDE

BACKGROUND OF THE INVENTION

This invention relates to a process for the production of high purity 5-chlorosalicylaldehyde, which is a commercial intermediate used in the syntheses of various pharmaceuticals and dyestuffs. Commercial requirements for 5-chlorosalicylaldehyde specify a minimum purity of 95 percent.

The monochlorination of salicylaldehyde proceeds quite smoothly and selectively to form 5-chlorosalicylaldehyde, as illustrated by the following reaction:

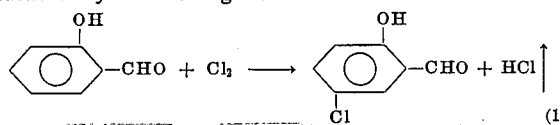

(1)

The temperature of the chlorination reaction is allowed to rise slowly and should reach 85° C. at 81 percent completion (specific gravity 100°/15.5° C. = 1.252) and 104° C. at 91 percent completion (corresponding to specific gravity 100°/15.5° C. = 1.264–1.266.

Gas chromatographic analysis of typical reaction mixtures chlorinated to a point between 91 and 95 percent of theory indicates the presence of 73.4 percent to 77.2 percent by weight of 5-chlorosalicylaldehyde, 9.6 percent to 11.8 percent by weight of unreacted salicylaldehyde, with the balance being distributed among four organic impurities (designated as A, B, C and D, respectively) as follows: A, 0.3% to 0.4%; B, 0.7% to 1.8%; C, 8.4% to 8.5%; and D, 3.7% to 4.2%.

The isolation by fractionation of 5-chlorosalicylaldehyde from the crude reaction mixture presents a number of problems, one of which is that partial polymerization occurs on prolonged exposure to high still temperatures and creates a tar residue which lowers the yields by 10 percent or even higher. By far the more serious problem, however, is the separation of 5-chlorosalicylaldehyde from the various organic impurities formed during the chlorination reaction.

Although it is relatively easy to separate low-boiling impurities A and the high-boiling impurity D from the 5-chlorosalicylaldehyde by fractional distillation, separation of 5-chlorosalicyaldehyde from impurities B and C requires a major fractionation, since both impurities B and C boil very closely to 5-chlorosalicylaldehyde.

Impurities B and C appear as high boilers on gas chromatographic analysis, but on fractionation impurity B is lower boiling than 5-chlorosalicylaldehyde while impurity C is high boiling. Surprisingly, these two impurities depress the melting point of 5-chlorosalicylaldehyde less than the impurities present in recrystallized 5-chlorosalicylaldehyde. In the latter, a melting point of 98° C. always corresponds to over 99 percent purity, but the distilled 5-chlorosalicylaldehyde with such melting point may be only 93 percent pure. Consequently, the melting point cannot be used as the sole indicia of purity for 5-chlorosalicylaldehyde.

Table I summarizes the results obtained when a crude reaction mixture from the chlorination of salicylaldehyde to 91 percent completion was fractionally distilled through a 10-plate column.

Even when a 30 plate column is used, only a minor part of the available 5-chlorosalicylaldehyde can be recovered with a 99 percent degree of purity. Consequently, the recovery and purification of 5-chorosalicylaldehyde by fractional distillation is not practical in commercial operations.

5-Chlorosalicylaldehyde is extremely soluble in many solvents, among which include the lower (one to three carbon atoms) alkanols. Recrystallization of 5-chlorosalicylaldehyde from these solvents invariably requires relatively large amounts of solvent and yields a recrystallized 5-chlorosalicylaldehyde having a relatively low bulk density. By way of illustration, when 5-chlorosalicylaldehyde is recrystallized from 50:50 isopropanol-water (by weight), the amount of solvent required to achieve stirrability is 5.18 pounds per pound of crude reaction.

STATEMENT OF THE INVENTION

During an investigation into the isolation and recovery of 5-chlorosalicylaldehyde from the crude reaction mixture formed upon the monochlorination of salicylaldehyde, it was found that when the crude reaction mixture is vacuum topped to remove substantially all of the unreacted salicylaldehyde while leaving most of the 5-chlorosalicylaldehyde and impurities in the distillation residue, then much less solvent is required to recrystallize the 5-chlorosalicylaldehyde and the resultant product has a higher bulk density than 5-chlorosalicylaldehyde recrystallized directly from the crude reaction mixture. Apparently the presence of the unreacted salicylaldehyde in the crude reaction mixture tends to promote the formation of small crystals of 5-chlorosalicylaldehyde and hence of a product with a low bulk density.

Based on these discoveries, the invention contemplates the improvement in a process for the production of 5-chlorosalicylaldehyde, in which salicylaldehyde is reacted with approximately an equimolar amount of chlorine to form a crude reaction mixture from which 5-chlorosalicylaldehyde is recovered by crystallization from a suitable solvent, which comprises subjecting the crude reaction mixture to a partial vacuum distillation to distill substantially all of the unreacted salicylaldehyde from the crude reaction mixture while leaving 5-chlorosalicylaldehyde and various organic impurities in the distillation residue, and then selectively crystallizing 5-chlorosalicylaldehyde from the solvent solution of the vacuum-topped distillation residue, thereby yielding crystallized 5-chlorosalicylaldehyde having a high degree of purity.

Using this improvement, 5-chlorosalicylaldehyde (m.p. 100.6° to 101.0° C., purity 99+percent when measured by gas chromatography) may be produced by a process which comprises:

a. reacting salicylaldehyde with approximately an equimolar amount of chlorine to form a crude reaction mixture composed of (i) a major amount of 5-chlorosalicylaldehyde, (ii) a minor amount of unreacted salicylaldehyde, and (iii) minor amounts of various organic impurities;

b. subjecting the crude reaction mixture to a partial vacuum distillation (or "vacuum topping") to distill substantially all of the unreacted salicylaldehyde from the crude reaction mixture while leaving 5-chlorosalicylaldehyde and the various organic impurities in the distillation residue;

c. dissolving the vacuum-topped distillation residue in an aqueous solution of a lower alkanol, and then crystallizing 5-chlorosalicyaldehyde from the resultant solution while leaving the organic impurities dissolved in the solution;

TABLE I.—FRACTIONAL DISTILLATION OF CRUDE REACTION MIXTURE

| Fraction | Wt. percent | M.P. (° C.) | Composition (percent) | | | | | |
|---|---|---|---|---|---|---|---|---|
| | | | Salicylaldehyde | A | B | 5-chlorosalicylaldehyde | C | D |
| 1 | 10.9 | (1) | 90.3 | 1.7 | | 7.1 | 0.9 | |
| 2 | 7.4 | 95.2–96.0 | 6.2 | 1.6 | 4.7 | 86.4 | 1.1 | |
| 3 | 7.0 | 99.9–100.2 | 0.4 | 0.2 | 4.8 | 93.1 | 1.5 | |
| 4 | 6.3 | 99.9–100.1 | 0.2 | 0.2 | 3.4 | 94.3 | 1.9 | |
| 5 | 33.9 | 98.5–99.4 | | | 1.5 | 95.6 | 2.9 | |
| 6 | 6.1 | 98.2–98.8 | | | 1.4 | 92.9 | 5.7 | |
| 7 | 5.0 | 91.0–95.1 | | | 1.0 | 86.0 | 12.5 | 0.5 |
| 8 | 2.4 | <80 | | | 1.1 | 52.5 | 41.2 | 5.2 |
| Residue | 16.8 | (2) | | | | | | |

1 Liquid.
2 Black tar.

Analysis of the data set forth in table I indicates (1) that in fractionally distilled 5-chlorosalicylaldehyde, the melting point is not in direct relationship to the degree of purity, and (2) that a 10-plate column is inadequate for this fractionation, since the highest degree of purity of 5-chlorosalicylaldehyde is only 95.6 percent, even though the melting point is over 98° C.

d. recovering the crystallized 5-chlorosalicylaldehyde.

BASIC PARAMETERS OF THE PROCESS

Basically, four steps are required to produce 5-chlorosalicylaldehyde in accordance with the process of the invention, namely (a) the chlorination of salicylaldehyde to form the crude reaction mixture, (b) the vacuum topping of the crude reaction mixture to remove the unreacted salicylaldehyde, (c) the crystallization of 5-chlorosalicylaldehyde from the vacuum-topped reaction mixture, using an aqueous alkanol as a solvent medium, and (d) recovery of the crystallized 5-chlorosalicylaldehyde.

Chlorination

The monochlorination of salicylaldehyde is quite selective and proceeds almost exclusively to the formation of 5-chlorosalicylaldehyde. For best results, the chlorination should be carried out until the specific gravity of the crude reaction mixture at 100°/15.5° C. reaches 1.26 (more specifically 1.264–1.266), at which point the reaction has proceeded to at least 90 percent of theoretical completion. The temperature of the chlorination mixture is allowed to go up slowly, regulated by moderate cooling since the reaction is exothermic, and should reach 85° C. at 81 percent of theoretical completion (specific gravity at 100°/15.5° C. = 1.252) and 104° C. at 91 percent of theoretical completion.

As the chlorination reaction proceeds, hydrogen chloride gas is liberated as a byproduct. Surprisingly, the solubility of HCl gas in the crude reaction mixture is quite high, even at temperature of 104° C. Even prolonged heating at 160° C. (atmospherically) removes only part of the dissolved HCl gas.

The composition of the crude reaction mixture formed by monochlorination of salicylaldehyde to 91 to 95 percent of theory (specific gravity 100°/15.5° C. = 1.264) is 77.2 percent of 5-chlorosalicylaldehyde, 9.6 percent of salicylaldehyde, 0.4 percent of impurity A, 0.7 percent of impurity B, 8.4 percent of impurity C, and 3.7 percent of impurity D, all percentages being by weight and estimated from the gas chromatographic analysis of the crude reaction mixture.

Vacuum Topping

Investigation has revealed that the presence of salicylaldehyde in the crude reaction mixture tends to promote the formation of small crystals of 5-chlorosalicylaldehyde from the solvent, probably due to some adsorption of salicylaldehyde onto the crystals of 5-chlorosalicylaldehyde. To avoid this problem, the crude reaction mixture is subjected to a partial fractional distillation under vacuum (or vacuum topping) to distill substantially all of the salicylaldehyde from the crude reaction mixture while leaving most of the 5-chlorosalicylaldehyde and the various organic impurities as the distillation residue. The extent of the vacuum is not critical, but it is important to keep the still temperature below 140° C. to avoid polymerization and a consequent diminution in yields.

A 10-plate column yields a distillate having about 83–85 percent salicylaldehyde and about 13–15 percent 5-chlorosalicylaldehyde with small amounts of high boilers. For example, a typical forerun had the following composition: 83.5 percent salicylaldehyde, 13.8 percent 5-chlorosalicylaldehyde, 2 percent impurity A, 0.5 percent impurity B, and 0.2 percent impurity C. Consequently, the size of the forerun should be slightly larger than the weight of the salicylaldehyde in the crude reaction mixture, which calculates to be about 11–12 percent by weight for chlorination reaction mixtures containing 9.2–10 percent of salicylaldehyde.

Crystallization

The vacuum-topped distillation residue contains about 86–87 percent of 5-chlorosalicylaldehyde, the balance made up of the various impurities formed during the chlorination reaction. Any suitable solvent may be used to recrystallize 5-chlorosalicylaldehyde from the vacuum-topped distillation residue, among which solvents include the lower alkanols containing from one to three carbon atoms as well as aqueous solutions of such solvents. In general, an aqueous solution of the alkanol increases the hot-cold solubility differential for 5-chlorosalicylaldehyde without being too poor a solvent for the organic impurities. Among the various solvents used, excellent results have been achieved using aqueous solutions of isopropanol. For example, the solubility of 5-chlorosalicylaldehyde in 50:50 isopropanol-water (by weight) at room temperature is only 2 percent by weight and the solvency for the organic impurities contained in the vacuum-topped distillation residue is excellent.

The vacuum-topped distillation residue is dissolved in the minimum amount of isopropanol-water (preferably a 50:50 isopropanol-water solvent pair), using only 2.8 pounds of isopropanol-water per pound of material. Complete solution can usually be obtained at temperatures in excess of 70° C.; slow cooling results in crystallization of 5-chlorosalicylaldehyde while leaving the impurities in solution. If desirable, the saturated solution may be seeded with crystals of 5-chlorosalicylaldehyde.

Recovery

After crystallization of the 5-chlorosalicylaldehyde, the mixture is filtered and the filter cake washed with the aqueous-alkanol to eliminate the mother liquor entirely. For most purposes, the alkanol can be recovered (isopropanol being recovered as an azeotrope with 12 percent water) from the mother liquor and combined washings, and subsequently reused in another crystallization. Upon drying, the resultant crystallized 5-chlorosalicylaldehyde analyzes at 100 percent purity by gas chromatography.

EXAMPLE

The following example is illustrative of the ease with which 5-chlorosalicylaldehyde may be produced in accordance with the process of the invention:

Salicylaldehyde was reacted with approximately an equimolar amount of chlorine, which was slowly added to the reactor, until the specific gravity of the crude reaction mixture at 100°/15.5° C. reached at 1.264, at which point the chlorination reaction had proceeded to 91 percent of theoretical completion. Moderate cooling was required, since the reaction is exothermic, so that the temperature rose slowly to a point in the range between 95°–98° C. The crude reaction mixture analyzed by gas chromatography at 77.2 percent of 5-chlorosalicylaldehyde, 9.6 percent of salicylaldehyde, 0.4 percent of impurity A, 0.7 percent of impurity B, 8.4 percent of impurity C, and 3.7 percent of impurity D.

The crude reaction mixture was then vacuum topped in a 10-plate column using a vacuum of 10 mm. Hg. At the start of topping, the still temperature was 113° C. and the distilled vapor was 65° C.; at the end, the still temperature was 118° C. and the distillate was 90° C. A 10-plate column yields a distillate of about 83–85 percent salicylaldehyde and about 13–15 percent of 5-chlorosalicylaldehyde with small amounts of high boilers. Analysis of the forerun showed 83.5 percent salicylaldehyde, 13.8 percent of 5-chlorosalicylaldehyde, 2 percent impurity A, 0.5 percent B, and 0.2 percent impurity C.

To a 1,000-gal. reactor was charged 4,800 lbs. (638 gallons) of 50 percent aqueous isopropanol and 1,670 pounds (about 160 gallons) of the vacuum-topped distillation residue. The mixture was brought to a temperature over 70° C., and then cooled slowly. After seeding with crystals of 5-chlorosalicylaldehyde, precipitation started at 69° C. On further cooling the mixture became rather thick but was still stirrable at 25° C.

When the mixture had cooled to 25° C., it was filtered and the filter cake washed three times with 50 gallons isopropanol-water (50 percent) to remove mother liquor. The wet weight of the washed cake was 2,440 pounds, dry weight 1,280 pounds, and volume of wet cake was 194 gals. The filter cake, when dried in vacuo, consisted of crystallized 5-chlorosalicylaldehyde, m.p. 100.6°–101.0° C., 99.9 percent purity (by gas chromatography).

I claim:

1. In a process for the production of 5-chlorosalicylaldehyde, in which salicylaldehyde is reacted with approximately an equimolar amount of chlorine to form a crude reaction mixture from which 5-chlorosalicylaldehyde is recovered by crystallization from a suitable solvent, the improvement which comprises subjecting the crude reaction mixture to a partial vacuum distillation to distill substantially all of the unreacted salicylaldehyde from the crude reaction mixture while leaving 5-chlorosalicylaldehyde and various organic impurities in the distillation residue, and then selectively crystallizing 5-chlorosalicylaldehyde from the solvent solution of the vacuum-topped distillation residue, thereby yielding crystallized 5-chlorosalicylaldehyde having a high degree of purity.

2. The process for producing 5-chlorosalicylaldehyde having a high degree of purity which comprises:

a. reacting salicylaldehyde with approximately an equimolar amount of chlorine to form a crude reaction mixture composed of (i) a major amount of 5-chlorosalicylaldehyde, (ii) a minor amount of unreacted salicylaldehyde, and (iii) minor amounts of various organic impurities.

b. subjecting the crude reaction mixture to a partial vacuum distillation to distill substantially all of the unreacted salicylaldehyde from the crude reaction mixture while leaving 5-chlorosalicylaldehyde and the various organic impurities in the distillation residue;

c. dissolving the vacuum-topped distillation residue in an aqueous solution of isopropanol, and then crystallizing 5-chlorosalicylaldehyde from the resultant solution while leaving the organic impurities dissolved in the solution; and d. recovering the crystallized 5-chlorosalicylaldehyde.

3. The process for producing 5-chlorosalicylaldehyde according to claim 2, in which the chlorination reaction is conducted at least until the specific gravity of the crude reaction mixture at 100°/15.5° C. reaches 1.26, at which point the chlorination reaction has proceeded to at least 90 percent of theoretical completion.

4. The process for producing 5-chlorosalicylaldehyde according to claim 2, in which the vacuum topping of unreacted salicylaldehyde from the crude reaction mixture is conducted under such conditions that the still temperature of the crude reaction mixture is kept below 140° C.

5. The process for producing 5-chlorosalicylaldehyde according to claim 2, in which the vacuum topping of unreacted salicylaldehyde from the crude reaction mixture is conducted at a pressure of about 10 mm. Hg. while the still temperature of the crude reaction mixture is maintained below 120° C.

6. The process for producing 5-chlorosalicylaldehyde according to claim 2, in which the aqueous solution of isopropanol contains about 50 percent by weight of isopropanol.

7. The process for producing 5-chlorosalicylaldehyde according to claim 2, in which the vacuum topped distillation residue is dissolved at a temperature in excess of 70° C. in an aqueous solution of isopropanol containing 50 percent by weight of isopropanol, and the resultant solution is then cooled slowly to crystallize 5-chlorosalicylaldehyde from the resultant solution while leaving the organic impurities dissolved in the solution.

8. The process for producing 5-chlorosalicylaldehyde having a high degree of purity which comprises a. reacting salicylaldehyde with approximately an equimolar amount of chlorine at least until the specific gravity of the crude reaction mixture 100°/15.5° C. reaches 1.26, thereby forming a crude reaction mixture composed of (i) a major amount of 5-chlorosalicylaldehyde, (ii) a minor amount of unreacted salicylaldehyde, and (iii) minor amounts of various organic impurities;

b. subjecting the crude reaction mixture to a partial vacuum distillation at a pressure of about 10 mm. Hg. while maintaining the still temperature of the crude reaction mixture below about 120° C., thereby distilling substantially all of the unreacted salicylaldehyde from the crude reaction mixture while leaving 5-chlorosalicylaldehyde and the various organic impurities in the distillation residue;

c. dissolving the vacuum-topped distillation residue at a temperature in excess of 70° C. in an aqueous solution of isopropanol containing 50 percent by weight of isopropanol, and then slowly cooling the resultant solution, thereby crystallizing 5-chlorosalicylaldehyde from the resultant solution while leaving the organic impurities dissolved in the solution; and d. recovering the crystallized 5-chlorosalicylaldehyde.

* * * * *